Patented Jan. 14, 1936

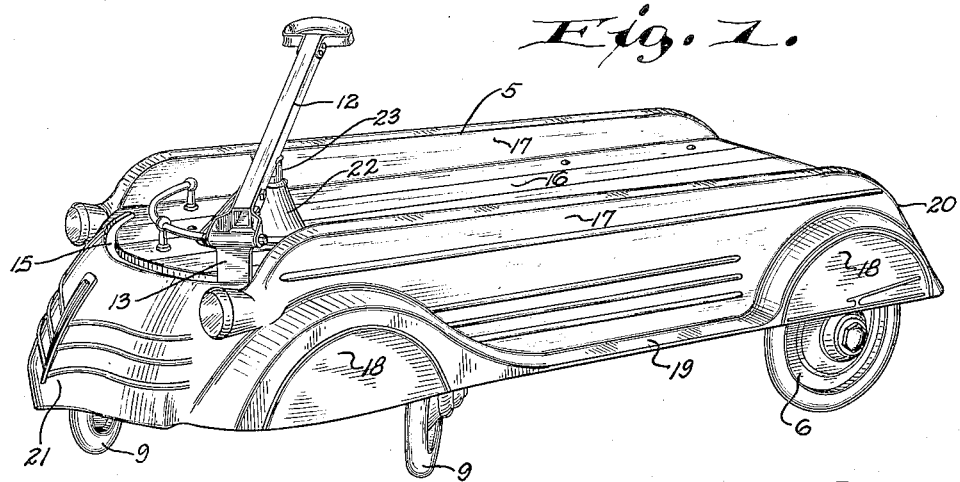
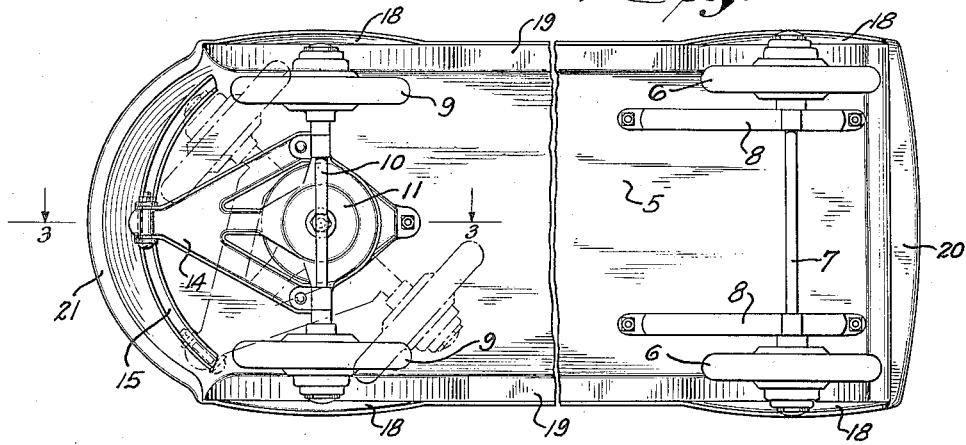
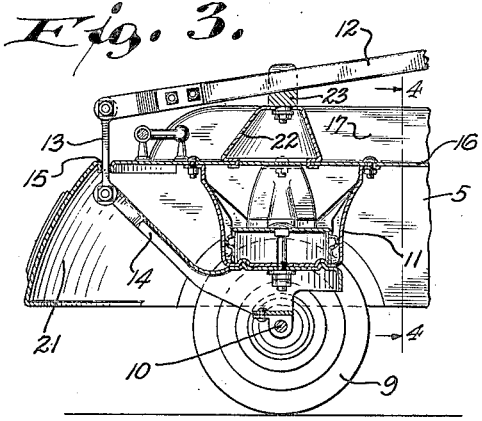
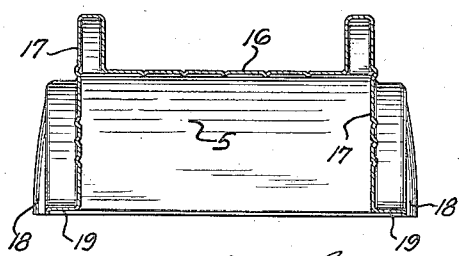

2,027,522

UNITED STATES PATENT OFFICE 2,027,522

COASTER WAGON

Joseph B. Eck, Sheboygan, Wis.

Application December 24, 1934, Serial No. 759,034

2 Claims. (Cl. 280—87.5)

The present invention relates in general to improvements in vehicular toys such as coaster wagons.

Generally defined, an object of the present invention is to provide a durable and highly attractive "stream-lined" coaster wagon, which is comfortable and flexible in use.

A more specific object of the invention is to provide a coaster wagon which may be easily propelled by pushing or pulling and which is designed to resemble the present-day "stream-lined" motor vehicle.

A further specific object of the invention is to provide steering mechanism for a vehicular toy wherein the front bolster and hound mechanism are covered and hidden by a portion of the vehicle body and in which the handle is connected to a steering connection plate which extends through and operates in an elongated, arcuate slot in the vehicle body.

Another specific object of the invention is to provide a vehicular toy wherein the chassis and mechanism are housed by overhanging body portions but in which the front wheels have a large steering or turning radius.

Still another specific object of the invention is to provide a coaster wagon in which, when the steering wheels are in an extreme position for turning, there is an effective support for the front end portion of the wagon to prevent the same from tipping or tilting.

A further object of the invention is to provide a coaster wagon in which the entire body thereof, including sides, running boards, and fenders, may be stamped from a single sheet of metal.

These and other specific objects of the invention will be apparent from the following detailed description.

A clear conception of embodiments of the various improved features, and of the mode of constructing and operating coaster wagons built in accordance with the invention, may be had by referring to the drawing accompanying and forming a part of this specification, in which like reference characters designate the same or similar parts in the various views.

Fig. 1 is a front and side perspective view of the improved coaster wagon, showing the wheels in a turned position for steering;

Fig. 2 is an inverted plan view of the wagon, on a slightly larger scale;

Fig. 3 is a fragmentary, detail sectional view taken on line 3—3 of Fig. 2; and

Fig. 4 is a detail sectional view through the body taken on line 4—4 of Fig. 3.

While the invention has been shown and described herein as being specifically applied to a particular type of coaster wagon, it is not intended to restrict the scope by such specific disclosure since some of the features may obviously be more generally applied to other types of vehicular toys.

Referring to the drawing, the coaster wagon shown comprises, in general, a "stream-lined", preferably one-piece, body 5 formed from sheet metal with the aid of dies; rear wheels 6 mounted to rotate upon a rear axle 7 carried by metallic brackets 8 secured to the lower, rear portion of the body 5; front wheels 9 mounted to rotate upon a front axle 10 pivotally coacting with the front of the body 5 through a fifth wheel and bolster mechanism 11; and a manipulating handle 12 pivotally associated with an extension plate 13, which projects upward from a front hound portion 14 through an arcuate body slot 15. The handle 12 may be either swung forwardly for pulling, or rearwardly over the body of the wagon for steering the wagon when it is pushed.

As previously indicated, the body 5 is preferably formed of a single sheet of metal and includes a flat, horizontal deck or bottom portion 16, and sides 17 extending upwardly therefrom and then downwardly a substantial distance, terminating slightly above the axles 7 and 10. Adjacent the wheels, said outer side portions are pressed outwardly and shaped to provide fender portions 18; and between the fenders there are horizontal running board portions 19. At the rear end, the body is sloped rearwardly, downwardly, in the nature of a "beaver-tail", as at 20; and at the front end there is a forwardly, downwardly inclined skirt portion 21. The outer side portions, in conjunction with said skirt portion 21, conceal, protect, and house the front axle, the fifth wheel and bolster mechanism, and some additional elements of the steering mechanism. Similarly, the rear axle and supporting brackets therefor are housed and concealed. The body, therefore, effectively houses and conceals the mechanism and gives the vehicle an attractive, "stream-lined" appearance.

The bolster and fifth-wheel mechanism 11 is shown in detail and is of the type illustrated in the Leicht Patent No. 1,784,017. In the present embodiment, however, the hound arms 14 are elongated beyond what is common in the standard practice; and the outer ends of the same terminate just below the juncture of the upper end of the body skirt 21 with the forward end of the deck 16. In the deck, thereadjacent, there is an elongated, arcuate slot 15 extending transversely of the deck. The lower end of the extension plate 13 is secured to the outer ends of the hound arms, and said plate extends vertically through said slot for movement therein. The bifurcated, inner end of the handle 12 is pivotally secured to the upper end of said plate 13. It will thus be seen that through the medium of the slot 15 and the plate 13, the pivotal connection for the handle is arranged exteriorly of the housing portions of the body; and steering manipulations can be readily effected. A turret 22 is rigidly mounted on the top surface of the deck above the fifth-wheel mechanism, and the top portion of said turret swivelingly carries a recessed swivel block 23. When the handle 12 is turned rearwardly, a portion thereof is adapted to seat in the recess of said swivel block. In this position of the handle, during steering manipulations, the handle functions as a lever, turning on the swivel block. The attached end of the handle carries with it the extension plate 13, which rides through the slot 15; and turning movement is imparted thereby to the hound and fifth wheel. The front axle 10 is carried by the lower hound portion, so it and the front wheels 9 will be swung arcuately for steering purposes. The mechanism employed, and the outwardly flanged, front fender portions 18, permit the wheels and axle to be turned through a relatively great steering arc, as shown in broken lines in Fig. 2. When the steering handle is turned to an extreme position in either direction, the plate 13 will engage an end of the slot 15; and this will limit the turning movement and provide a support which will conteract tipping tendencies of the front portion of the vehicle body.

From the foregoing description, it will be noted that the present invention provides a durable and attractive coaster wagon construction, which is both comfortable and flexible in use. The body portions may be suitably decorated, and the entire structure may be readily manufactured and sold at moderate cost. The steering arrangement is especially novel and effective. This arrangement does not interfere with the "streamlining" effects, and by the expedient of providing hound extensions, an extension plate and a body slot, the handle connection is effected exteriorly of the housing, but operation of the moving parts is not interfered with.

It should be understood that it is not intended to limit the invention to the exact details of construction herein shown and described, for various modifications within the scope of the claims may occur to persons skilled in the art.

What is claimed as the invention is:

1. In a coaster wagon, a metallic body, bolster means depending therefrom, pairs of wheels on which said body is supported carried by said bolster means, said body including a deck and overhanging side and end portions and completely housing and concealing all of the bolster means and portions of the wheels, and a steering connection extending through the body externally thereof and associated with the bolster means for one pair of wheels.

2. In a vehicle, a body including a deck and depending side and end aprons, bolster means depending from the deck, two pairs of wheels on which said body is supported carried by said bolster means, said aprons completely housing and concealing all of the bolster means and portions of the wheels, and a steering connection extending above the deck and associated with the bolster means for one pair of wheels, said latter pair of wheels being angularly displaceable through a relatively large arc entirely within the space between said side aprons.

JOSEPH B. ECK.